United States Patent
Maamari et al.

(10) Patent No.: US 10,771,142 B2
(45) Date of Patent: *Sep. 8, 2020

(54) SYSTEM AND METHOD FOR HIERARCHAL BEAMFORMING AND RANK ADAPTATION FOR HYBRID ANTENNA ARCHITECTURE

(71) Applicant: Futurewei Technologies, Inc., Plano, TX (US)

(72) Inventors: Diana Maamari, Palatine, IL (US); Hao Zhou, Evanston, IL (US); Qian Cheng, Naperville, IL (US); Weimin Xiao, Hoffman Estates, IL (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/422,637

(22) Filed: May 24, 2019

(65) Prior Publication Data

US 2019/0280753 A1    Sep. 12, 2019

Related U.S. Application Data

(63) Continuation of application No. 15/800,739, filed on Nov. 1, 2017, now Pat. No. 10,305,567.

(Continued)

(51) Int. Cl.
*H04L 1/02* (2006.01)
*H04B 7/06* (2006.01)
(Continued)

(52) U.S. Cl.
CPC ............ *H04B 7/0626* (2013.01); *H04B 7/04* (2013.01); *H04B 7/063* (2013.01); *H04B 7/0639* (2013.01);
(Continued)

(58) Field of Classification Search
CPC ........ H04B 7/0626; H04B 7/04; H04B 7/063; H04B 7/0639; H04B 7/0695; H04B 7/0857; H04W 24/10
(Continued)

(56) References Cited

U.S. PATENT DOCUMENTS

| 2012/0003945 A1 | 1/2012 | Liu et al. |
| 2013/0229307 A1 | 9/2013 | Chang et al. |

(Continued)

FOREIGN PATENT DOCUMENTS

| CN | 101908921 A | 12/2010 |
| CN | 103125083 A | 5/2013 |
| WO | 2015147445 A1 | 10/2015 |

OTHER PUBLICATIONS

3GPP TSG RAN WG1 #85 R1-164893,"Hybrid Beamforming for Massive MIMO",CMCC, May 23 27, 2016, 5 pages.
(Continued)

*Primary Examiner* — Helen E Tayong
(74) *Attorney, Agent, or Firm* — Slater Matsil, LLP

(57) ABSTRACT

An embodiment method for beam-related information and channel state information feedback includes receiving first analog beamformed reference signals; transmitting a first report indicating a set of selected analog beamformed reference signals and a transmission rank that jointly maximize a first performance criterion for subsequent transmissions by a transmitter that transmitted the first analog beamformed reference signals; receiving second analog beamformed reference signals maximized in accordance with the set of selected analog beamformed reference signals and the transmission rank; and transmitting a second report, in accordance with the second analog beamformed reference signals, indicating a channel quality indicator and a precoding matrix indicator that maximize a second performance criterion for subsequent transmissions by the transmitter that transmitted (Continued)

the first analog beamformed reference signals and the second analog beamformed reference signals.

24 Claims, 7 Drawing Sheets

Related U.S. Application Data

(60) Provisional application No. 62/417,187, filed on Nov. 3, 2016.

(51) Int. Cl.
*H04B 7/08* (2006.01)
*H04B 7/04* (2017.01)
*H04W 24/10* (2009.01)

(52) U.S. Cl.
CPC ......... *H04B 7/0695* (2013.01); *H04B 7/0857* (2013.01); *H04B 7/0632* (2013.01); *H04W 24/10* (2013.01)

(58) Field of Classification Search
USPC .......................................................... 375/267
See application file for complete search history.

(56) References Cited

U.S. PATENT DOCUMENTS

| | | | |
|---|---|---|---|
| 2013/0242773 A1* | 9/2013 | Wernersson | H04B 7/024 370/252 |
| 2013/0301454 A1 | 11/2013 | Seol et al. | |
| 2014/0044044 A1 | 2/2014 | Josiam et al. | |
| 2014/0241274 A1 | 8/2014 | Lee et al. | |
| 2014/0286182 A1 | 9/2014 | Chen et al. | |
| 2014/0321563 A1 | 10/2014 | Park et al. | |
| 2015/0085838 A1 | 3/2015 | Benjebbour et al. | |
| 2016/0241323 A1* | 8/2016 | Ko | H04B 7/0691 |
| 2017/0033846 A1 | 2/2017 | Rende et al. | |
| 2018/0034612 A1* | 2/2018 | Lin | H04L 5/0048 |
| 2018/0076857 A1* | 3/2018 | Jung | H04B 7/0408 |
| 2018/0076943 A1 | 3/2018 | Clerckx et al. | |

OTHER PUBLICATIONS

3GPP TSG RAN WG1 Meeting #85 R1-164254,"Views on NR MIMO design",CATT, May 23 27, 2016, 4 pages.

3GPP TSG RAN WG1 Meeting #86bis R1-1609028,"Completing mechanism 1 of hybrid CSI for Rel.14", Samsung, Oct. 10-14, 2016, 3 pages.

Hur, S., et al., "Multilevel Millimeter Wave Beamforming for Wireless Backhaul," The Second GlobeCom 2011 Workshop on Femtocell Networks, IEEE, pp. 253-257.

Kyocera, "Dynamic Beamformed CSI-RS for Elevation Beamforming/ FD-MIMO", 3GPP TSG RAN WG1 Meeting #80bis, R1-151471, Apr. 20-24, 2015, XP050934343, Belgrade, Serbia.

CMCC, "CSI acquisition framework for NR MIMO", 3GPP TSG RAN WG1 Meeting #86, R1-167111, Aug. 22-26, 2016, 3 pages, XP051125717, Gothenburg, Sweden.

* cited by examiner

SYSTEM AND METHOD FOR HIERARCHAL BEAMFORMING AND RANK ADAPTATION FOR HYBRID ANTENNA ARCHITECTURE

CROSS-REFERENCE TO RELATED APPLICATIONS

This application is a continuation of U.S. patent application Ser. No. 15/800,739, filed on Nov. 1, 2017 and entitled "System and Method for Hierarchal Beamforming and Rank Adaptation for Hybrid Antenna Architecture," which claims priority to U.S. Provisional Application No. 62/417,187, filed on Nov. 3, 2016, both of which applications are hereby incorporated herein as if reproduced in their entireties.

TECHNICAL FIELD

The present disclosure relates generally to a system and method for wireless communications, and, in particular embodiments, to systems and methods for hierarchical beamforming and rank adaptation for a hybrid antenna architecture.

BACKGROUND

Millimeter-wave (mmWave) communication may employ directional antennas, which offer increased antenna gain to cope with the increased path loss experienced at high mmWave frequencies. A high beamforming gain may be achieved by employing a large number of transmit and receive antenna elements to compensate for the higher path loss. However, having a large number of radio frequency (RF) chains for each antenna element imposes high costs. Therefore, hybrid beamforming technology, a technology that combines both analog and digital beamforming, with few RF chains and a large number of antennas, is a valuable technology for mmWave wireless communication. Analog precoding is typically implemented at RF using phase shifters, while digital precoders are implemented at baseband. With the sparse scattering nature of mmWave channels, hybrid precoding may achieve improved performance while offering a lower complexity transceiver architecture.

SUMMARY

In accordance with an embodiment of the present disclosure, a method for beam-related information and channel state information feedback comprises receiving first analog beamformed reference signals; transmitting a first report indicating a set of selected analog beamformed reference signals and a transmission rank that jointly maximize a first performance criterion for subsequent transmissions by a transmitter that transmitted the first analog beamformed reference signals; receiving second analog beamformed reference signals maximized in accordance with the set of selected analog beamformed reference signals and the transmission rank; and transmitting a second report, in accordance with the second analog beamformed reference signals, indicating a channel quality indicator and a precoding matrix indicator that maximize a second performance criterion for subsequent transmissions by the transmitter that transmitted the first analog beamformed reference signals and the second analog beamformed reference signals.

In the previous embodiment, the first performance criterion might be at least one of: a capacity of an analog beam from the transmitter; a signal-to-noise ratio of an analog beam from the transmitter; or a signal-to-interference-plus-noise ratio of an analog beam from the transmitter. In any of the previous embodiments, the second performance criterion might be a codeword from a digital precoding codebook that maximizes a data rate from the transmitter. In any of the previous embodiments, the data rate might be calculated in accordance with at least one of a spectral efficiency or a sum-rate after minimum mean-square error combining.

In accordance with another embodiment of the present disclosure, a device comprises a non-transitory memory storage comprising instructions and one or more processors in communication with the memory storage. The one or more processors execute the instructions to: receive first analog beamformed reference signals; transmit a first report indicating a set of selected analog beamformed reference signals and a transmission rank that jointly maximize a first performance criterion for subsequent transmissions by a transmitter that transmitted the first analog beamformed reference signals; receive second analog beamformed reference signals maximized in accordance with the set of selected analog beamformed reference signals and the transmission rank; and transmit a second report, in accordance with the second analog beamformed reference signals, indicating a channel quality indicator and a precoding matrix indicator that maximize a second performance criterion for subsequent transmissions by the transmitter that transmitted the first analog beamformed reference signals and the second analog beamformed reference signals.

In the previous embodiment, the first performance criterion might be at least one of: a capacity of an analog beam from the transmitter; a signal-to-noise ratio of an analog beam from the transmitter; or a signal-to-interference-plus-noise ratio of an analog beam from the transmitter. In any of the previous embodiments, the second performance criterion might be a codeword from a digital precoding codebook that maximizes a data rate from the transmitter. In any of the previous embodiments, the data rate might be calculated in accordance with at least one of a spectral efficiency or a sum-rate after minimum mean-square error combining.

In accordance with another embodiment of the present disclosure, a method for beam-related information and channel state information feedback comprises transmitting first analog beamformed reference signals; receiving a first report indicating at least one transmission rank and at least one analog beamformed reference signal that maximize a first performance criterion for subsequent transmissions by a transmitter that transmitted the first analog beamformed reference signals; transmitting second analog beamformed reference signals maximized in accordance with the at least one transmission rank and the at least one analog beamformed reference signal; receiving a second report indicating a channel quality indicator and a precoding matrix indicator that maximize a second performance criterion for subsequent transmissions by the transmitter that transmitted the first analog beamformed reference signals and the second analog beamformed reference signals; and transmitting in accordance with the channel quality indicator and the precoding matrix indicator.

In the previous embodiment, the first performance criterion might be at least one of: a capacity of an analog beam from the transmitter; a signal-to-noise ratio of an analog beam from the transmitter; or a signal-to-interference-plus-noise ratio of an analog beam from the transmitter. In any of the previous embodiments, the second performance criterion might be a codeword that maximizes a data rate from the transmitter. In any of the previous embodiments, the first report might include a plurality of transmission ranks and a plurality of analog beamformed reference signals that maximize the first performance criterion, and the transmitter might select one of the plurality of transmission ranks and one of the plurality of analog beamformed reference signals for use in transmitting the second analog beamformed reference signals.

In accordance with another embodiment of the present disclosure, a device comprises a non-transitory memory storage comprising instructions and one or more processors in communication with the memory storage. The one or more processors execute the instructions to: transmit first analog beamformed reference signals; receive a first report indicating at least one transmission rank and at least one analog beamformed reference signal that maximize a first performance criterion for subsequent transmissions by a transmitter that transmitted the first analog beamformed reference signals; transmit second analog beamformed reference signals maximized in accordance with the at least one transmission rank and the at least one analog beamformed reference signal; receive a second report indicating a channel quality indicator and a precoding matrix indicator that maximize a second performance criterion for subsequent transmissions by the transmitter that transmitted the first analog beamformed reference signals and the second analog beamformed reference signals; and transmit in accordance with the channel quality indicator and the precoding matrix indicator.

In the previous embodiment, the first performance criterion might be at least one of: a capacity of an analog beam from the transmitter; a signal-to-noise ratio of an analog beam from the transmitter; or a signal-to-interference-plus-noise ratio of an analog beam from the transmitter. In any of the previous embodiments, the second performance criterion might be a codeword that maximizes a data rate from the transmitter. In any of the previous embodiments, the first report might include a plurality of transmission ranks and a plurality of analog beamformed reference signals that maximize the first performance criterion, and the transmitter might select one of the plurality of transmission ranks and one of the plurality of analog beamformed reference signals for use in transmitting the second analog beamformed reference signals.

In accordance with another embodiment of the present disclosure, a method for beam-related information and channel state information feedback comprises receiving first analog beamformed reference signals; transmitting a first report indicating a set of selected analog beamformed reference signals that maximize a first performance criterion for subsequent transmissions by a transmitter that transmitted the first analog beamformed reference signals; receiving second analog beamformed reference signals maximized in accordance with the set of selected analog beamformed reference signals; and transmitting a second report, in accordance with the second analog beamformed reference signals, indicating a channel quality indicator and a precoding matrix indicator that maximize a second performance criterion for subsequent transmissions by the transmitter that transmitted the first analog beamformed reference signals and the second analog beamformed reference signals, wherein a transmission rank associated with at least one selected analog beamformed reference signal is included in one of only the first report, only the second report, or both the first report and the second report.

In the previous embodiment, the first performance criterion might be at least one of: a capacity of an analog beam from the transmitter; a reference signal received power of an analog beam from the transmitter; a signal-to-noise ratio of an analog beam from the transmitter; or a signal-to-interference-plus-noise ratio of an analog beam from the transmitter. In any of the previous embodiments, the second performance criterion might be a codeword from a digital precoding codebook that maximizes a data rate from the transmitter. In any of the previous embodiments, the data rate might be calculated in accordance with at least one of a spectral efficiency or a sum-rate after minimum mean-square error combining.

An advantage the above embodiments is that feedback information can be derived with less computational complexity and transmitted more efficiently than in existing techniques.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 is an illustration of embodiment beam patterns for different values of a;

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
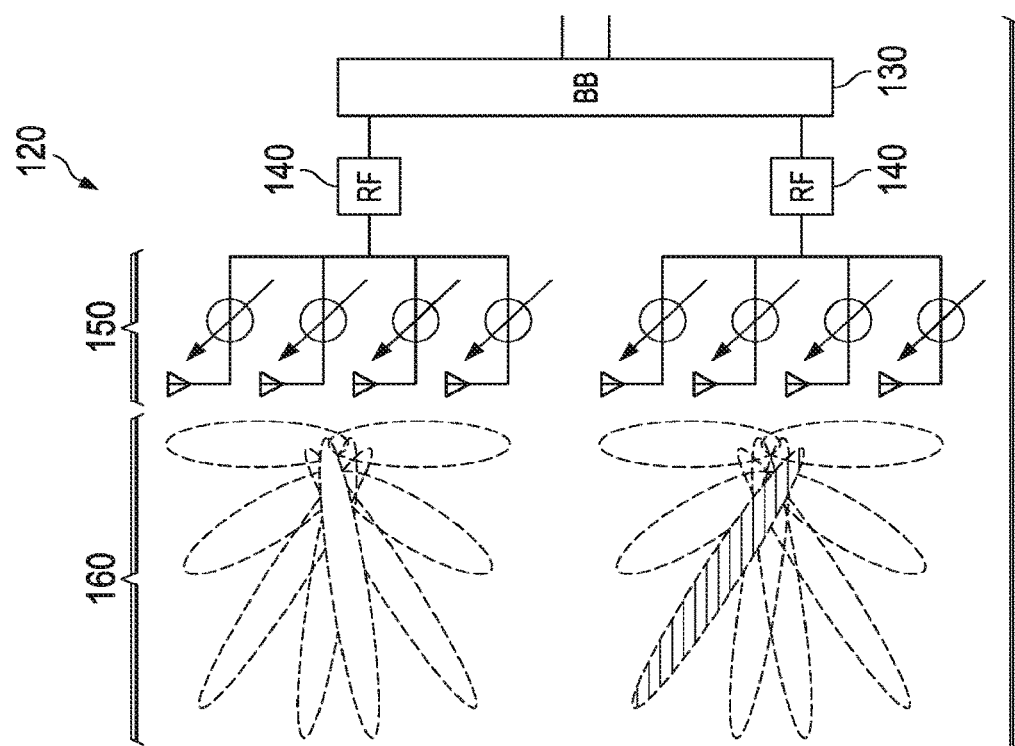
FIG. 1 is a diagram showing a transmitter and receiver with a hybrid beamforming architecture.
Figure 1:
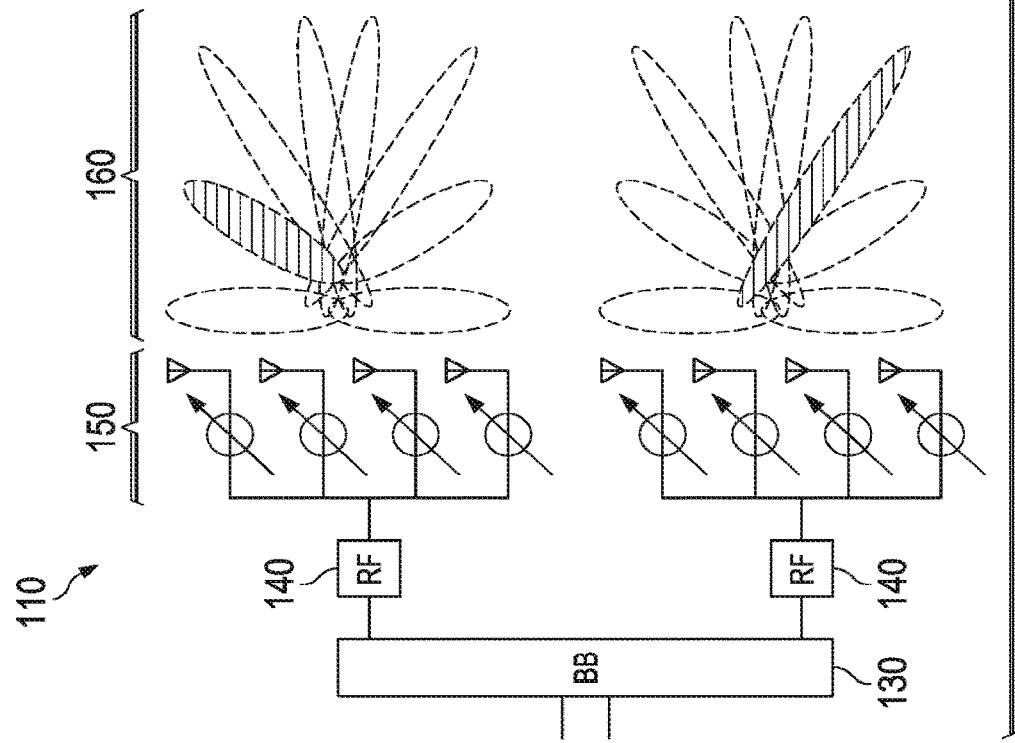

FIG. 1 illustrates a transmitter and receiver each having a hybrid beamforming architecture. The component on the left side of the figure may act as a transmitter at times, and the component on the right side of the figure may act as a receiver at times, and vice versa. For the purposes of the following discussion, the component on the left side of the figure will be assumed to be a transmitter, and the component on the right side of the figure will be assumed to be a receiver. Also, for the purposes of the following discussion, the receiver will be assumed to be a user equipment (UE) 120 or a similar user device, and the transmitter will be assumed to be an eNodeB (eNB) 110 or similar component through which the UE 120 can gain access to a telecommunications network. When the terms "UE" and "eNB" are used herein, it should be understood that any component with capabilities similar to a UE or an eNB is being referred to.

Precoding for digital beamforming might be performed in either or both of the eNB 110 and the UE 120 in a baseband component 130. Precoding for analog beamforming might be performed in either or both of the eNB 110 and the UE 120 by phase shifters in one or more RF components 140. Since both digital beamforming and analog beamforming are performed at the eNB 110 and the UE 120, the eNB 110 and the UE 120 can be considered to have a hybrid beamforming architecture. The precoded digital and analog signals might be transmitted by an antenna array 150 on either or both of the eNB 110 and the UE 120. The antenna array 150 on either or both of the eNB 110 and the UE 120 might transmit one or more hybrid beamformed beams 160.

Analog beamforming and combining may be performed in different ways. Discrete Fourier transform (DFT) codebooks are one type of codebook that can be used to establish analog beams. With such codebooks, an eNB or a UE can search to find the codeword that maximizes a performance metric, such as throughput, and can apply the codeword at the phase shifters. When terms such as "maximize," "optimize," "best," "largest," "highest," "strongest," and the like are used herein, the terms may refer to a characteristic that exceeds a defined threshold for a particular quality under the given circumstances and may not necessarily refer to an absolute maximum for that quality.

One way of searching over a codebook is to perform an exhaustive search over all possible codebooks. However, such a search can increase latency and is problematic for delay sensitive applications. In order to reduce the beam scanning time imposed when an exhaustive search over DFT codebooks is adopted, multilevel codebooks may be used, where codebooks in different levels at different stages have different beamwidths and where, at each stage, the beamforming search space covered by the transmitter (UE or eNB) is reduced based on a feedback signal from the receiver (eNB or UE) that tells the transmitter which branch of beams to search over.

In an embodiment, a mechanism is provided for fine tuning of antenna elements within an antenna array, such as a uniform linear array or a uniform planar array. The mechanism is able to create the beams with different beamwidths at different levels of beamforming. In an embodiment, a protocol to support this multilevel beamforming is provided.

As mentioned above, with multilevel beamforming the search complexity over analog beams is reduced. Typically, at a first stage or level, wider beams with less antenna gain and a smaller number of beams are created, and the transmitter scans over those beams. The receiver sends feedback to the transmitter regarding the best beam, thereby guiding the transmitter to a branch on which to continue the search. In a second stage or level, the transmitter creates narrower beams with a higher antenna gain within the beam chosen in the first stage. The algorithm may be continued until the last stage of training.

Existing multilevel codebook designs may enable the adaptive control of analog beams by dividing the array of antenna elements into subarrays of a smaller number of elements and directing the beams of the subarrays to nearby directions to recreate a wide beam. This technique, however, may create undesirable beams because the sidelobes of each subarray may superimpose on the mainlobe of the consecutive subarray and thereby cause a reduction in power.

In an embodiment, a method is provided for creating beam patterns with varying beamwidths at different levels of a codebook. In particular, in an embodiment, an array is not divided into smaller subarrays. In order to demonstrate how this method operates, the mechanism is demonstrated on a Uniform Linear Array (ULA) with N elements and an inter-antenna spacing of d. The mechanism may be extended to a Uniform Planar Array (UPA), in which case the codeword becomes the Kronecker product of two ULA codewords.

The discussion focuses on DFT-based codebooks applied at the Radio Frequency (RF) analog precoder. In such a case, the beam vectors are given by column vectors of the following matrix $$w_{n,k} = \frac{1}{\sqrt{N}} e^{j\pi n 2k/K} = \frac{1}{\sqrt{N}} e^{j\pi n v_k} \quad (1)$$

where n=0, 1, . . . , N−1 is the index of an antenna element and k=0, 1, . . . , K−1 is the index of a codeword within the analog DFT codebook, which has a total number of codewords (total number of possible beams) equal to K and where $$v_k = \frac{2k}{K}$$

corresponds to values between [−1, +1].

In the technique to create the multilevel beams, the following weight vector may be considered $$w_{n,k} = \frac{1}{\sqrt{N}} e^{j\pi n \theta_{n,k}} \quad (2)$$

where the actual expression of $\theta_{n,k}$ will be derived below. $\theta_{n,k}$ is a function of the index n and k, and therefore, for a certain beam k within a codebook of size K, different antenna elements will point to different directions instead of all antenna elements pointing to the same direction $v_k$.

The values of $\theta_{n,k}$ may be assumed to be within a range referred to as $[v_k-t, v_k+t]$ with $$t \le \frac{+1}{K} \text{ and } -t \ge \frac{-1}{K}.$$

If t=0, then the resulting weights correspond to the DFT codebook, where $\theta_{n,k}=v_k$ for all n.

The actual expression of $\theta_{n,k}$ will now be derived. To do so, it may be necessary to identify what t is. For a given number of antennas (N) and size of codebook (K), it may be known that for the k-th beam, the beam should cover the range of $$\left[v_k - \frac{1}{K}, v_k + \frac{1}{K}\right],$$

because there are K beams that cover from [−1, +1]. So each beam covers the range of 2/K. Since the k-th beam is centered at $v_k$, the range is $$\left[v_k - \frac{1}{K}, v_k + \frac{1}{K}\right].$$

Therefore, a beam of beamwidth 2/K is the target beamwidth or desired beamwidth. t may need to be chosen such that the resulting beam will approximately have a beamwidth from $$-\frac{1}{K} \text{ to } +\frac{1}{K}.$$

A relationship between between t and 1/K may be defined by introducing a parameter α (alpha), which may replace t and may later be used for controlling the beamwidth. α may be defined as $$\alpha = \frac{1/K}{t}, \text{ so } t = \frac{1}{\alpha K}.$$

Figure 2:
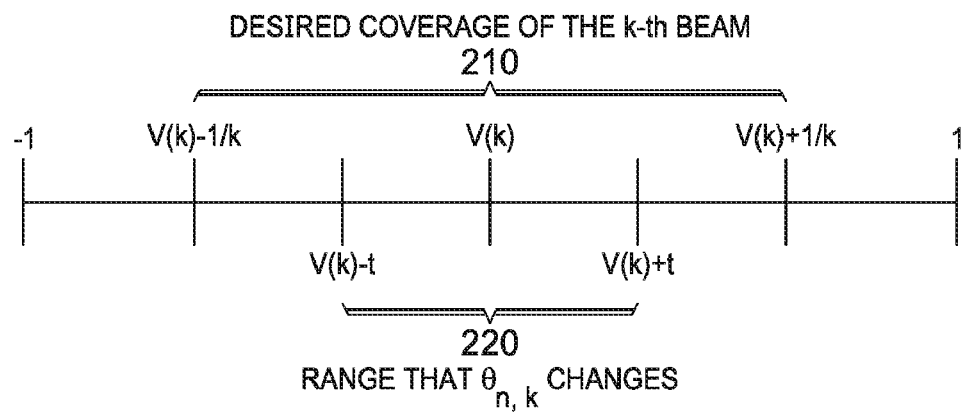
FIG. 2 is an illustration of a desired coverage area and a range of $\theta_{n,k}$.

It may be noted that α is the ratio between the desired coverage of the beam and the range where the values of $\theta_{n,k}$ are taken from. These parameters are illustrated in FIG. 2, where the desired coverage 210 of the k-th beam is $$\left[v_k - \frac{1}{K}, v_k + \frac{1}{K}\right],$$

and the range 220 that $\theta_{n,k}$ changes is $[v_k-t, v_k+t]$.

Therefore, for the k-th codeword, $\theta_{n,k}$ changes uniformly within $$\left[v_k - \frac{1}{\alpha K}, v_k + \frac{1}{\alpha K}\right].$$

Therefore, the granularity of change between two consecutive $\theta_{n,k}$ and $\theta_{n+1,k}$ is equal $$\frac{2}{tN} = \frac{2}{\alpha N K}.$$

Figure 3:
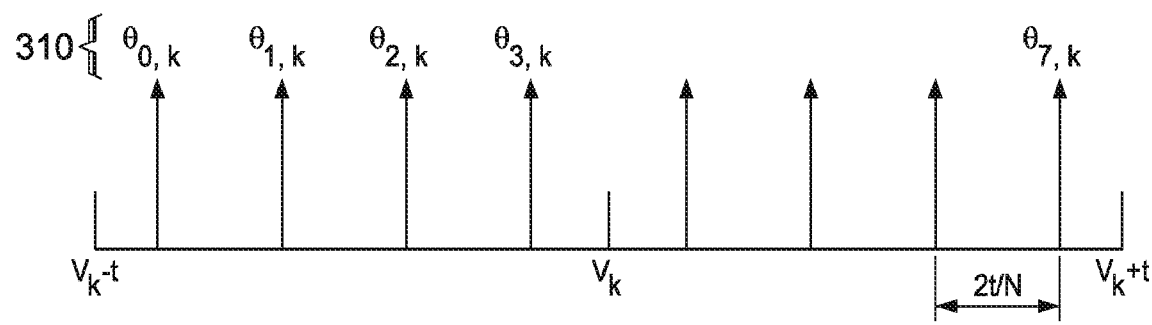
FIG. 3 is an illustration of values of $\theta_{n,k}$ for N=8 antenna elements.

So $\theta_{n,k}$ may be defined as $$\theta_{n,k} = v_k + \left(n - \frac{N-1}{2}\right)\frac{2}{\alpha N K} \quad (3)$$

where n=0, 1, ..., N−1. FIG. 3 illustrates various values 310 of $\theta_{n,k}$.

Different values of α may be shown to result in beams with different beamwidths by plotting the antenna response. Without loss of generality, it may be assumed that the inter-antenna spacing is half of a wavelength (d=λ/2).

For a ULA array, the antenna response after applying the k-th codeword is $$A_k(u) = \frac{1}{\sqrt{N}} \sum_{n=0}^{N-1} e^{j\pi n \left(v_k + \frac{2n-(N-1)}{\alpha N K} - u\right)}. \quad (4)$$

Without loss of generality, the analysis may focus on the first beam, that is, k=0. Thus, equation (4) may be simplified as $$A_0(u) = \frac{1}{\sqrt{N}} \sum_{n=0}^{N-1} e^{j\pi n \left(\frac{2n-(N-1)}{\alpha N K} - u\right)}. \quad (5)$$

After some simplification, equation (5) becomes $$|A_0(u)|^2 = 1 + \frac{2}{N}\sum_{x=1}^{N-1} S_x \quad (6)$$

$$= 1 + \frac{2}{N}\sum_{r=1}^{N-1} \cos\left[\alpha\pi\left(u - \frac{N-1}{\alpha N K}\right)\right] \frac{\sin\left(\pi\frac{2x(N-x)}{\alpha N K}\right)}{\sin\left(\pi\frac{2x}{\alpha N K}\right)}$$

Figure 4:
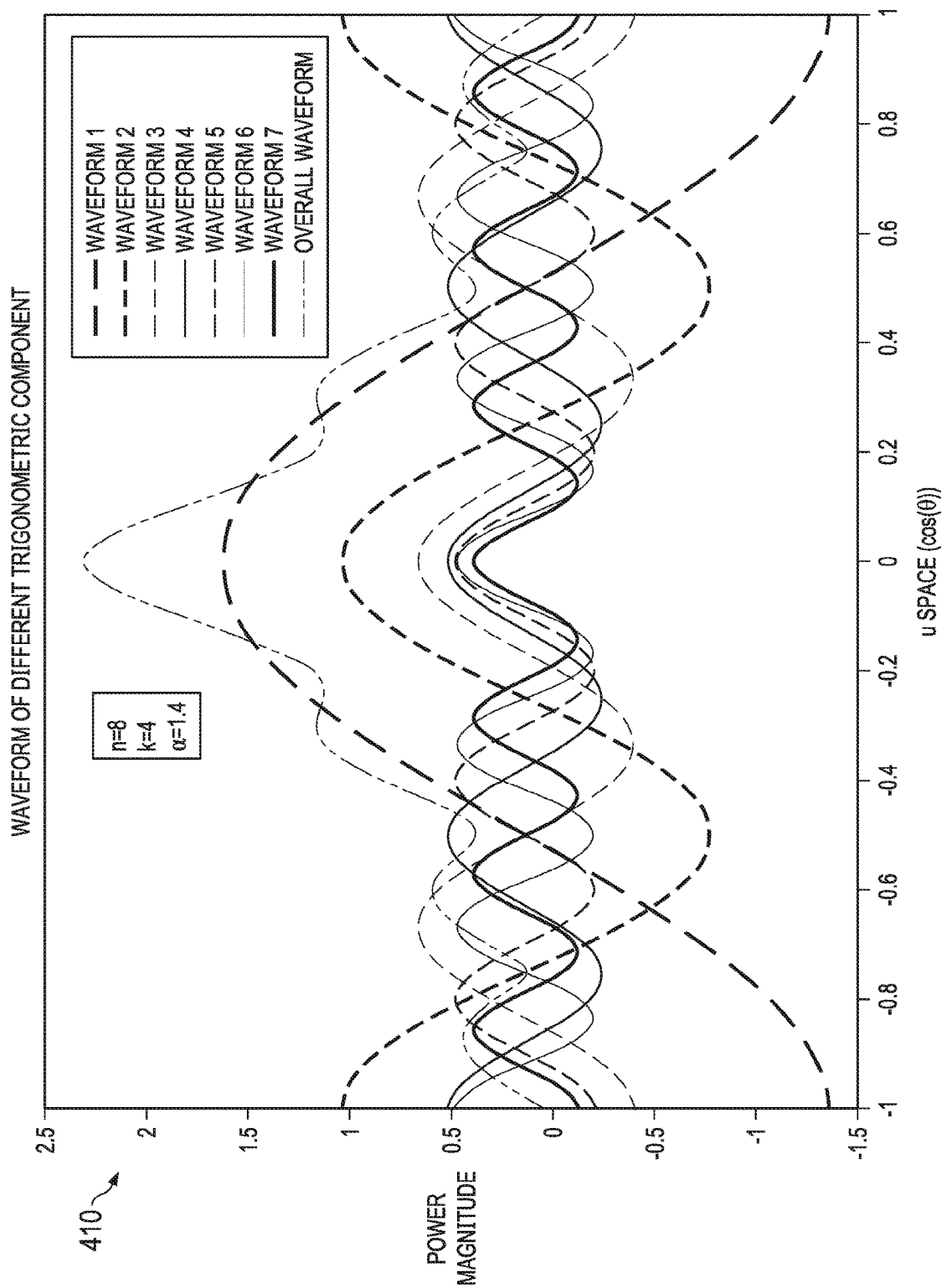
FIG. 4 is an illustration of embodiment waveforms of different trigonometric components.

From equation (6), it can be seen that the antenna response is a summation of (N−1) trigonometric functions. In FIG. 4, example waveforms 410 where N=8 are shown. There are 7 waveforms, and the overall antenna response is shown as the dashed curve.

Figure 5:
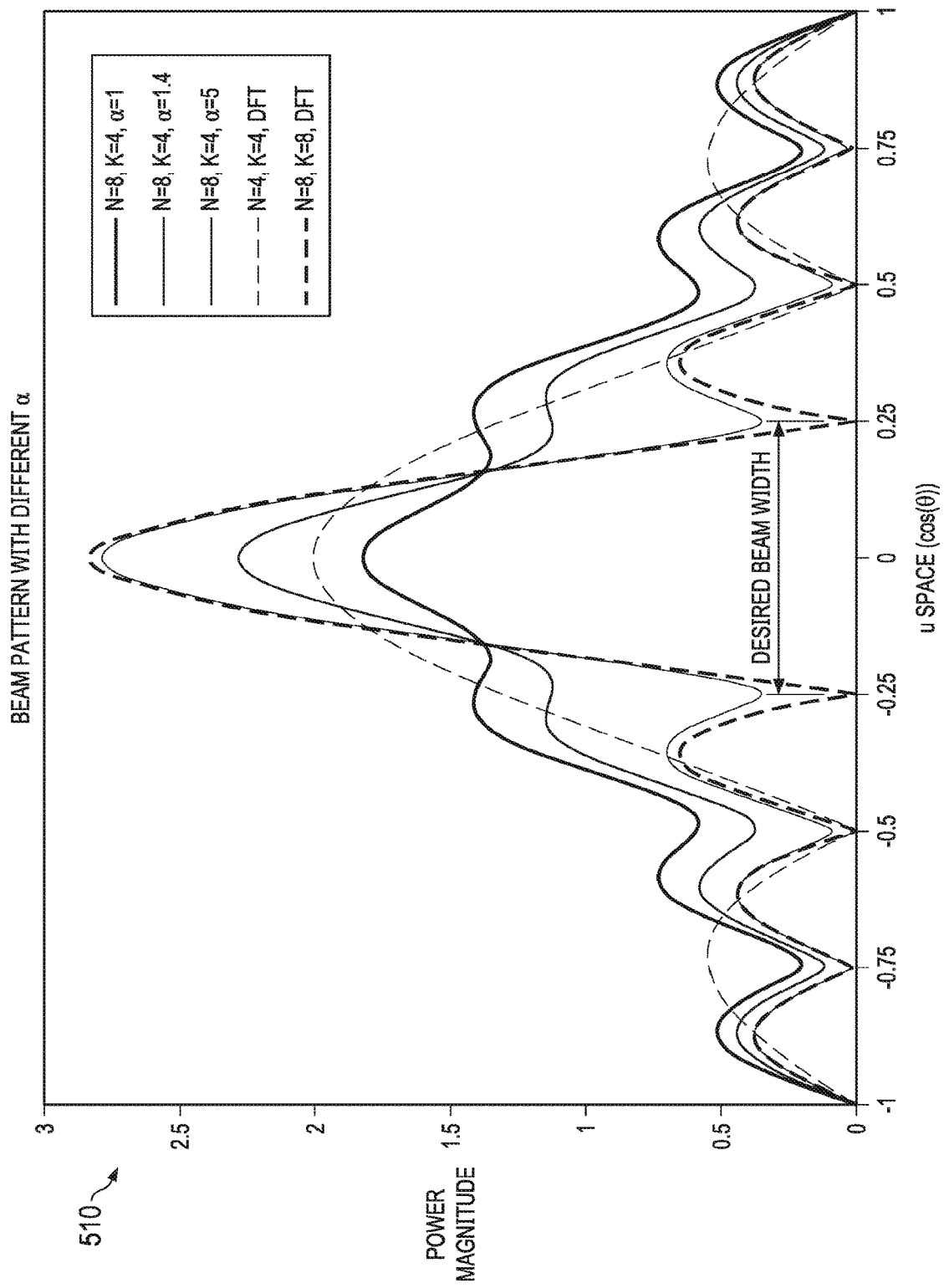

In general, the beam pattern is controlled by α. FIG. 5 shows how the beam patterns 510 change with different a. If a increases, for example for α=5, the beam pattern of the resulting beam is narrower (higher antenna gain). If a decreases, for example for α=1, the beam becomes wider, and the magnitude of the sidelobes also increases.

The above technique for controlling a beam pattern may be referred to as continuous squinting. The use of the disclosed continuous squinting technique is simpler and more efficient than existing methods because only one parameter, α, is needed to establish the beam. Therefore, only one parameter is needed for feedback from the receiver to the transmitter in order to signal the desired beamwidth and antenna gain. It can be shown that some properties of the beam change monotonically with a, such as largest beamforming gain, beamwidth, and sidelobe strength. Based on different design metrics, α may be optimized using a simple bisection search. By comparison, the existing sub-group method requires first deciding on the number of sub-groups in addition to the angle of each subgroup to recreate the widebeam. Also, in the existing method, the problem of destructive sidelobes to the mainlobe arises.

The disclosed continuous squinting technique is also more efficient because there is no deactivation of antenna elements with continuous squinting. A simple method to obtain wide beams is to deactivate one or more antennas. By turning off some antennas, wide beams can be achieved with a simple DFT-type codebook. However, a drawback of this method is that antenna gain may be lost, and the beamforming gain may be lower as a result. For mmWave communication, less beamforming gain makes the signal more vulnerable to transmission attenuation, noise, and interference, which reduces the accuracy of beam scanning. Continuous squinting, on the other hand, uses all antennas and may therefore achieve a higher beamforming gain.

In order to support the disclosed hierarchal beam mechanism, the eNB and UE may need to decide on a particular α. To do so, the eNB may generate different analog codebooks using different values of α. The eNB may need to know which a best suits the UE depending on the coverage range of that particular UE within the beam that the eNB has used.

There are cases where the UE might not be covered by a narrow beam, and therefore the UE does not report the largest possible a used by the eNB. For this reason, the UE may measure the received signal strength and find the value of $\alpha$ which gives the strongest received signal. The UE may then feed the quantized parameter $\alpha$ (or an index) back to the eNB.

In particular, the eNB may create different analog codebooks by varying the a parameter and may transmit the reference signal for UE measurement. Upon reception by the UE, the UE may first measure the received signal strength. An index of the optimal $\alpha$ may then be fed back to the eNB. Alternatively, a quantized version of the optimal $\alpha$ may be fed back to the eNB.

Techniques will now be considered regarding how to perform a Channel State Information (CSI) and beam-related information feedback protocol in a system employing analog beamforming, digital beamforming, or a hybrid of analog beamforming and digital beamforming. In a typical feedback scenario, a transmitter transmits a reference signal that is received by a receiver. The receiver analyzes the reference signal, derives the CSI in accordance with the analysis, and feeds the CSI back to the transmitter. In Third Generation Partnership Project (3GPP) Long Term Evolution (LTE) systems, CSI feedback consists of feedback of a Channel Quality Indicator (CQI), a Precoding Matrix Indicator (PMI), and a Rank Indicator (RI). The transmitter uses the CQI to select one of 15 modulation alphabet and code rate combinations for transmission. The RI informs the transmitter about the number of useful transmission layers for the current multiple-input and multiple-output (MIMO) channel. The PMI signals the codebook index of the preferred digital precoding matrix.

When hybrid beamforming that uses both analog and digital beamforming is employed, an indication of one or more preferred beams might need to be fed back from the receiver to the transmitter in addition to the CSI feedback (CQI, PMI, RI). That is, a transmitter might transmit a sequence of reference signals, each of which has been encoded by a different digital codeword within a digital precoding codebook. A receiver receiving the reference signals might determine one or more preferred reference signals among the received reference signals based on various performance criteria. The receiver might then feed an indication of the one or more preferred or optimal reference signals back to the transmitter. In the following discussion, reference signals might be referred to as being transmitted by an eNB, and the feedback generated from the reference signals might be referred to as being transmitted by a UE, but it should be understood that other components might transmit the reference signals and the feedback.

In an existing feedback method for a hybrid architecture that can be referred to as the joint method, the optimal analog beams, the RI, the PMI, and the CQI are determined jointly. The eNB tries different transmission ranks/layers, and for each transmission rank/number of layer, the eNB and UE search different beam pairs. For each beam pair, the UE estimates the effective channel after analog beamforming. Then the UE tries different digital codewords within the codebook in an attempt to maximize some performance criterion, such as the data rate. The UE finds the combination of analog beam pair, RI, PMI, and CQI that gives the highest data rate or a maximum of some other performance criterion. The UE then feeds back the RI, the PMI, the CQI, and an index for the preferred analog beam reference signal in a single transmission. Such an exhaustive mechanism to jointly discover RI, PMI, CQI, and a preferred beam is computationally complex and imposes delay, especially when the number of analog beams and the number panels or arrays to search is large. That is, finding a jointly optimal solution for the beam-related information in addition to the CSI values may not be feasible due to feedback delay constraints, especially when the number of arrays/panels and the number of beams is large. It may also be desirable to reduce computational complexity.

In an embodiment, a protocol is provided that can support feedback of beam-related and CSI parameters with a favorable tradeoff between performance and complexity by separating the optimization problem into multiple stages. In particular, the disclosed protocol allows rank-dependent beam selection and reporting, where a rank (i.e., a number of layers) and its associated/preferred set of beams are selected and reported separately from selection and reporting of PMI and CQI. Separating analog beam and rank selection from CQI and PMI selection results in negligible performance loss compared to the existing joint selection method.

Different ranks of transmission (as indicated by different RIs) generally correspond to different sets of preferred beams. That is, a particular rank is typically associated with one or more particular beams. For example, a rank 1 transmission might be associated with a first beam and a fourth beam, and a rank 2 transmission might be associated with a fifth beam and a seventh beam.

In an embodiment, the reporting of CSI takes place in two steps in order to reduce UE complexity and network overhead. In the first step, the preferred set of reference signals and the corresponding RI (the number of layers to be transmitted) are determined and reported jointly. In the second step, the PMI and the CQI are determined over the beamformed reference signal and reported. A two-step CSI report where the adaptation parameters are sequentially fed back and where the rank of transmission is jointly fed back with the preferred set of beams in a first step can reduce delay and provide good performance.

More specifically, in stage 1, the UE finds the preferred set of beams at the transmitter and receiver, as well as the transmission rank or number of layers to be transmitted. The eNB tries different transmission ranks. For each transmission rank, the eNB and UE search different beam pairs in an attempt to find a preferred set. The preferred set of beams might be a set that maximizes a performance criterion, such as the capacity of an analog beam from the eNB or the reference signal received power (RSRP) at the UE. Such a criterion of selection might be important for MIMO transmission. The UE then reports a preferred rank and its associated set of beams.

In another embodiment, multiple values of ranks (i.e., different numbers of layers) and an associated and/or preferred set of beams for each rank might be selected and reported by the UE for rank adaptation and associated beam adjustment. The transmitter might then select a rank and a preferred beam from the multiple reported ranks and beams.

In stage 2, the beams and the transmission rank obtained in stage 1 are used to generate a second set of reference signals. The beams and the transmission rank might have been selected and reported by the UE or might have been chosen by the eNB from the multiple values of ranks and the associated/preferred set of beams reported by the UE. The eNB generates a beamformed reference signal in accordance with the reported or chosen rank and beams. The UE receives the beamformed reference signal and uses the beamformed reference signal to determine and report the rest of the CSI parameters. That is, the UE finds the digital PMI at the eNB and the appropriate CQI to maximize the data rate or some other performance criterion for subsequent transmissions from the eNB.

In order to decide on the PMI, the UE estimates the effective channel after beamforming. Next, the UE tries different codewords in the digital precoding codebook to determine a codeword that maximizes the data rate of transmissions from the eNB or some other performance criterion. The UE might use the spectral efficiency, the sum-rate after minimum mean-square error (MMSE) combining, or some other performance criterion to calculate the data rate. The UE then feeds back the PMI of the best digital codeword as well as the CQI in the second stage of reporting.

In another embodiment, after the UE reports the preferred set of beams and the transmission rank in the first stage of reporting, the UE reports the transmission rank again along with the PMI and CQI in the second stage of reporting. The retransmitted transmission rank might assist the eNB in selecting a PMI to be used in subsequent transmissions.

In another embodiment, the UE reports only the preferred beams in the first stage of reporting and does not report the transmission rank. The eNB then forms the effective MIMO channel for the reference signal resources based only on the preferred reference beams. The UE then feeds back the transmission rank along with the CQI and the PMI in the second stage of reporting.

In another embodiment, the transmission rank is not necessarily similar to the rank reported by the UE.

The periodicity of stage 1 and stage 2 reporting can be long-term and short-term, respectively. With long-term reporting, the rank indicator and the preferred beam are estimated and reported in the long term with a periodicity that can be configured by the network. The reporting of the CQI and PMI can be of a shorter term with a periodicity configured by network. That is, the values for RI and the preferred beam might be derived and reported relatively less frequently, and the values for CQI and PMI might be derived and reported relatively more frequently.

Figure 6:
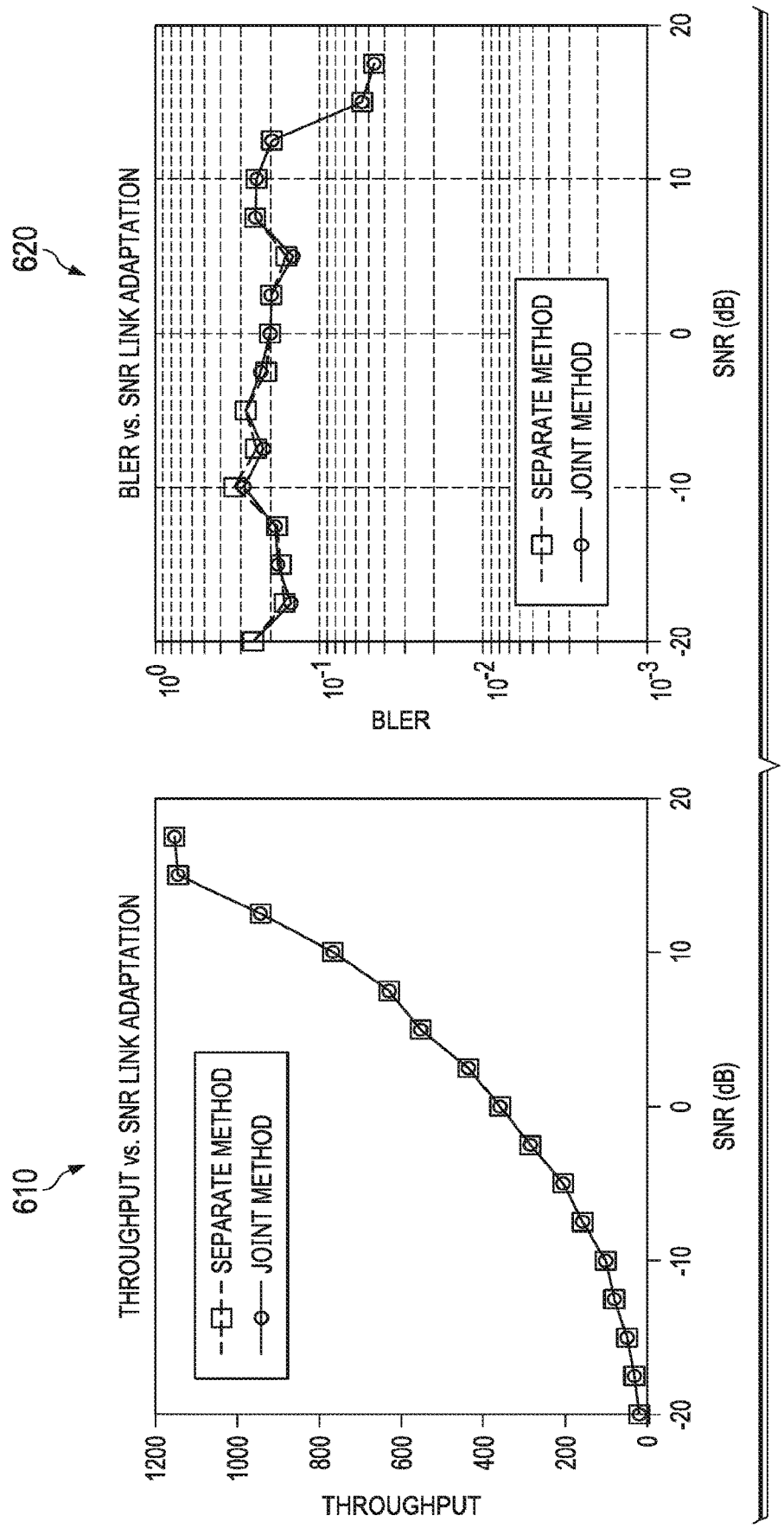
FIG. 6 is an illustration of joint digital and analog rank adaptation compared to an embodiment separate digital and analog rank adaptation with respect to throughput and block error rate.

In FIG. 6, the existing exhaustive search algorithm and the disclosed two-stage feedback mechanism are compared in terms of throughput 610 and Block Error Rate (BLER) 620 for a mmWave system with a hybrid antenna architecture at both the UE and the eNB with link adaptation. In the joint method, the optimal analog beams, PMI, optimal modulation and coding scheme and rank of transmission are decided on jointly. In the disclosed method, the optimal analog beams and rank of transmission are decided on in an initial stage. From numerical simulations, it may be shown that both techniques provide similar performance. Therefore, separating analog beam and rank selection from CQI and digital PMI selection results in negligible performance loss compared to the joint selection method. Configuration may be done by higher layers through radio resource control (RRC) signaling.

In an embodiment, a UE performing rank adaptation provides two CSI feedback reports. In the first CSI report, responsive to the UE receiving a first analog beamformed reference signal from an eNB, the UE indicates one or more preferred analog beams and a rank of transmission that jointly maximize a performance criterion, such as the capacity of an analog beam from the eNB, the RSRP of an analog beam from the eNB, the signal-to-noise ratio (SNR) of an analog beam from the eNB, or the signal-to-interference-plus-noise ratio (SINR) of an analog beam from the eNB. Responsive to reception of the first CSI report, the eNB uses the reported analog beams and transmission rank to generate and transmit a second analog beamformed reference signal over the effective channel. The UE then decides on the digital precoder that maximizes performance and sends a second CSI report indicating a PMI for the digital precoder as well as a CQI to the eNB. The digital precoder that maximizes performance might be a codeword that maximizes the data rate of a transmission from the eNB or some other performance criterion. The UE might use the spectral efficiency, the sum-rate after MMSE combining, or some other performance criterion to calculate the data rate.

Figure 7:
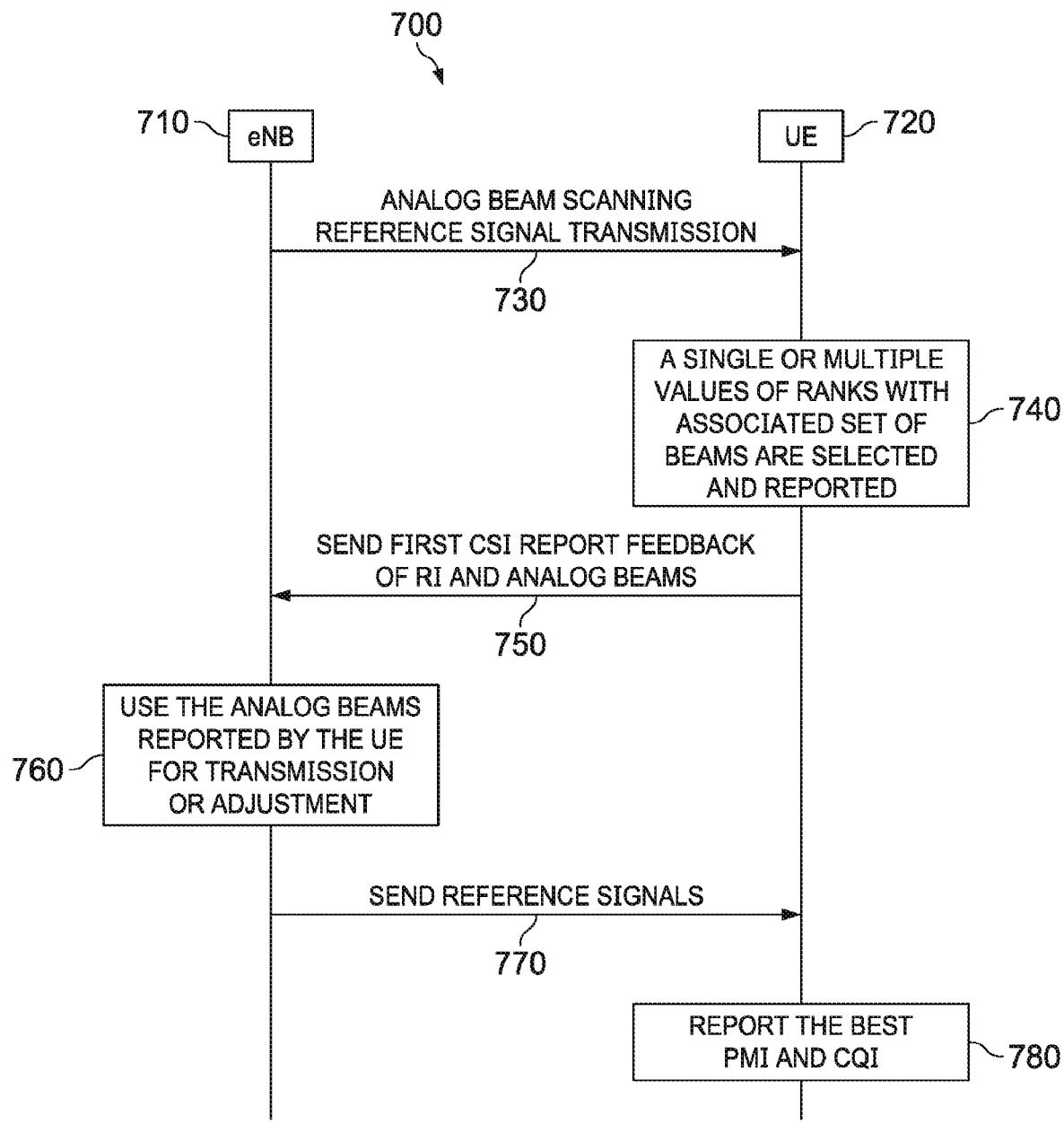
FIG. 7 is a flowchart of an embodiment channel state information acquisition algorithm.

FIG. 7 is a flowchart 700 of the disclosed protocol for communication between an eNB 710 and a UE 720. At event 730, the eNB 710 transmits an analog beam scanning reference signal to the UE 720. At event 740, the UE 720 selects a single value or multiple values of ranks and an associated set of beams. At event 750, the UE 720 transmits a first CSI report containing feedback of the selected RI and analog beams. At event 760, the eNB 710 uses the analog beams reported by the UE 720 for transmission or adjustment of additional reference signals. At event 770, the eNB 710 transmits the additional reference signals to the UE 720. At event 780, the UE 720 reports the best PMI and CQI, determined in accordance with the additional reference signals, to the eNB 710.

The disclosed CSI acquisition algorithm may be implemented in any system with digital and/or analog beams and is not restricted to a hybrid antenna architecture system.

Figure 8:
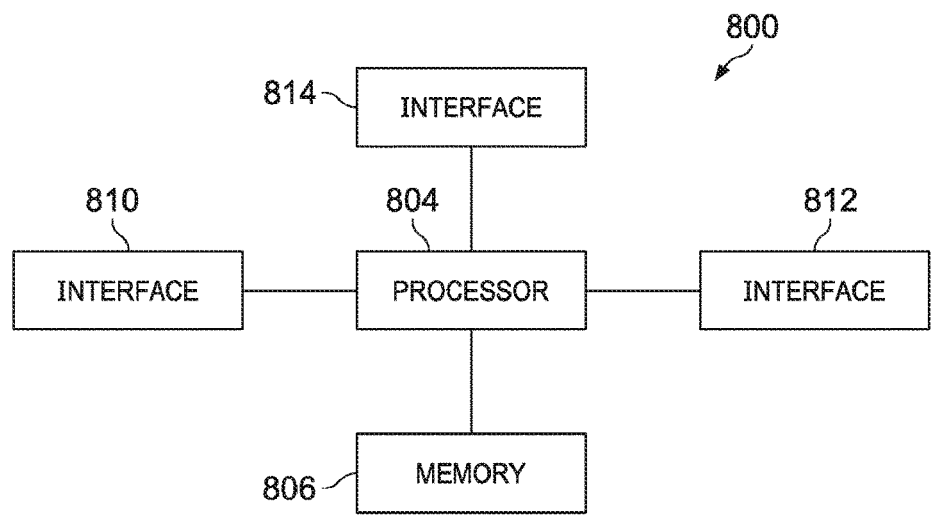
FIG. 8 is a block diagram illustrating an embodiment processing system for performing methods described herein.

FIG. 8 is a block diagram illustrating an embodiment processing system 800 for performing methods described herein, which may be installed in a host device. As shown, the processing system 800 includes a processor 804, a memory 806, and interfaces 810-814, which may (or may not) be arranged as shown in the figure. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in the figure, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
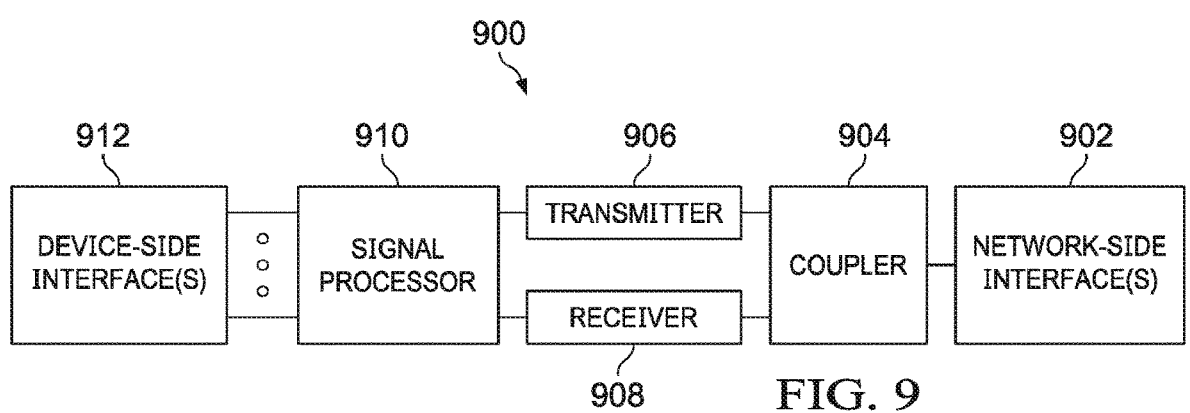
FIG. 9 is a block diagram illustrating a transceiver adapted to transmit and receive signaling over a telecommunications network.

In some embodiments, one or more of the interfaces 810, 812, 814 connects the processing system 800 to a transceiver adapted to transmit and receive signaling over the telecommunications network. FIG. 9 is a block diagram illustrating a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method comprising:
   receiving, by a user equipment (UE), first beamformed reference signals;
   transmitting, by the UE, a first report that indicates at least one reference signal index based on the first beamformed reference signals;
   receiving, by the UE, at least a second beamformed reference signal after transmitting the first report;
   transmitting, by the UE, a second report that includes a precoding matrix indicator derived from the second beamformed reference signal; and
   receiving, by the UE, a beamformed data signal after transmitting the second report.

2. The method of claim 1, wherein a digital precoder of the beamformed data signal is selected according to the precoding matrix indicator included in the second report, and wherein an analog beam used to transmit the beamformed data signal is selected according to the at least one reference signal index included in the first report.

3. The method of claim 1, wherein the first report further indicates a transmission rank derived from the first beamformed reference signals.

4. The method of claim 3, wherein a digital precoder of the beamformed data signal is selected according to the precoding matrix indicator included in the second report, and wherein an analog beam used to transmit the beamformed data signal is selected according to the at least one reference signal index and the transmission rank included in the first report.

5. The method of claim 1, wherein the second report further indicates a channel quality indicator derived from the second beamformed reference signal.

6. The method of claim 5, wherein a digital precoder of the beamformed data signal is selected according to the channel quality indicator and the precoding matrix indicator included in the second report, and wherein an analog beam used to transmit the beamformed data signal is selected according to the at least one reference signal index included in the first report.

7. A user equipment (UE) comprising:
   a non-transitory memory storage comprising instructions; and
   one or more processors in communication with the non-transitory memory storage, wherein the one or more processors execute the instructions to:
   receive first beamformed reference signals;
   transmit a first report that indicates at least one reference signal index based on the first beamformed reference signals;
   receive at least a second beamformed reference signal after transmitting the first report;
   transmit a second report that includes a precoding matrix indicator derived from the second beamformed reference signal; and
   receive a beamformed data signal after transmitting the second report.

8. The UE of claim 7, wherein a digital precoder of the beamformed data signal is selected according to the precoding matrix indicator included in the second report, and wherein an analog beam used to transmit the beamformed data signal is selected according to the at least one reference signal index included in the first report.

9. The UE of claim 7, wherein the first report further indicates a transmission rank derived from the first beamformed reference signals.

10. The UE of claim 9, wherein a digital precoder of the beamformed data signal is selected according to the precoding matrix indicator included in the second report, and wherein an analog beam used to transmit the beamformed data signal is selected according to the at least one reference signal index and the transmission rank included in the first report.

11. The UE of claim 7, wherein the second report further indicates a channel quality indicator derived from the second beamformed reference signal.

12. The UE of claim 11, wherein a digital precoder of the beamformed data signal is selected according to the channel quality indicator and the precoding matrix indicator included in the second report, and wherein an analog beam used to transmit the beamformed data signal is selected according to the at least one reference signal index included in the first report.

13. A method comprising:
   receiving, by a user equipment (UE), first beamformed reference signals;
   transmitting, by the UE, a first report that indicates at least one reference signal index based on the first beamformed reference signals;
   receiving, by the UE, at least a second beamformed reference signal after transmitting the first report;
   transmitting, by the UE, a second report that includes a channel quality indicator derived from the second beamformed reference signal; and
   receiving, by the UE, a beamformed data signal after transmitting the second report.

14. The method of claim 13, wherein a digital precoder of the beamformed data signal is selected according to the channel quality indicator included in the second report, and wherein an analog beam used to transmit the beamformed data signal is selected according to the at least one reference signal index included in the first report.

15. The method of claim 13, wherein the first report further indicates a transmission rank derived from the first beamformed reference signals.

16. The method of claim 15, wherein a digital precoder of the beamformed data signal is selected according to the channel quality indicator included in the second report, and wherein an analog beam used to transmit the beamformed data signal is selected according to the at least one reference signal index and the transmission rank included in the first report.

17. The method of claim 13, wherein the second report further indicates a precoding matrix indicator derived from the second beamformed reference signal.

18. The method of claim 17, wherein a digital precoder of the beamformed data signal is selected according to the channel quality indicator and the precoding matrix indicator included in the second report, and wherein an analog beam used to transmit the beamformed data signal is selected according to the at least one reference signal index included in the first report.

19. A user equipment (UE) comprising:
   a non-transitory memory storage comprising instructions; and
   one or more processors in communication with the non-transitory memory storage, wherein the one or more processors execute the instructions to:
   receive first beamformed reference signals;
   transmit a first report that indicates at least one reference signal index based on the first beamformed reference signals;
   receive at least a second beamformed reference signal after transmitting the first report;
   transmit a second report that includes a channel quality indicator derived from the second beamformed reference signal; and
   receive a beamformed data signal after transmitting the second report.

20. The UE of claim 19, wherein a digital precoder of the beamformed data signal is selected according to the channel quality indicator included in the second report, and wherein an analog beam used to transmit the beamformed data signal is selected according to the at least one reference signal index included in the first report.

21. The UE of claim 19, wherein the first report further indicates a transmission rank derived from the first beamformed reference signals.

22. The UE of claim 21, wherein a digital precoder of the beamformed data signal is selected according to the channel quality indicator included in the second report, and wherein an analog beam used to transmit the beamformed data signal is selected according to the at least one reference signal index and the transmission rank included in the first report.

23. The UE of claim 19, wherein the second report further indicates a precoding matrix indicator derived from the second beamformed reference signal.

24. The UE of claim 23, wherein a digital precoder of the beamformed data signal is selected according to the channel quality indicator and the precoding matrix indicator included in the second report, and wherein an analog beam used to transmit the beamformed data signal is selected according to the at least one reference signal index included in the first report.

* * * * *